US012029157B2

(12) United States Patent
Smeets

(10) Patent No.: US 12,029,157 B2
(45) Date of Patent: Jul. 9, 2024

(54) MULTI-CONFIGURABLE MOWER DECK

(71) Applicant: Briggs & Stratton, LLC, Wauwatosa, WI (US)

(72) Inventor: Daniel Smeets, Beesel (NL)

(73) Assignee: Briggs & Stratton, LLC, Wauwatosa, WI (US)

( * ) Notice: Subject to any disclaimer, the term of this patent is extended or adjusted under 35 U.S.C. 154(b) by 679 days.

(21) Appl. No.: 16/645,395

(22) PCT Filed: Sep. 7, 2018

(86) PCT No.: PCT/US2018/049839
§ 371 (c)(1),
(2) Date: Mar. 6, 2020

(87) PCT Pub. No.: WO2019/051154
PCT Pub. Date: Mar. 14, 2019

(65) Prior Publication Data
US 2020/0281117 A1      Sep. 10, 2020

Related U.S. Application Data

(60) Provisional application No. 62/555,806, filed on Sep. 8, 2017.

(51) Int. Cl.
*A01D 34/00*       (2006.01)
*A01D 34/66*       (2006.01)
(Continued)

(52) U.S. Cl.
CPC .......... *A01D 34/667* (2013.01); *A01D 34/66* (2013.01); *A01D 34/71* (2013.01); *A01D 34/81* (2013.01);
(Continued)

(58) Field of Classification Search
CPC .. A01D 2101/00; A01D 34/66; A01D 34/668; A01D 34/685; A01D 34/82; A01D 34/005; A01D 34/81
See application file for complete search history.

(56) References Cited

U.S. PATENT DOCUMENTS

| 5,133,176 | A | * | 7/1992 | Baumann | A01D 34/005 |
| | | | | | 56/320.1 |
| 5,205,112 | A | * | 4/1993 | Tillotson | A01D 34/685 |
| | | | | | 56/DIG. 17 |

(Continued)

FOREIGN PATENT DOCUMENTS

| EP | 1 767 084 A1 | 3/2007 | |
| EP | 2609804 A1 * | 7/2013 | ............. A01D 34/71 |

OTHER PUBLICATIONS

Extended European Search Report and Written Opinion regarding EP Appl. No. 18853234.5, dated May 6, 2021, 9 pps.
(Continued)

*Primary Examiner* — Adam J Behrens
(74) *Attorney, Agent, or Firm* — Foley & Lardner LLP

(57) ABSTRACT

A multi-configurable mower deck for use with a lawn-mower, the mower deck including a top surface, a front leading edge, at least one side wall extending from the top surface, and at least one partial rear wall extending from the top surface. The mower deck includes both a side-discharge opening formed on one side of the mower deck and a rear-discharge opening formed through the at least one partial rear wall. Additionally, the mower deck may include a selectively removable secondary front baffle configured to block the flow of clippings through the side-discharge opening and direct the flow of clippings toward the rear-discharge opening. The mower deck may also include at least one selectively removable rear baffle, wherein the at least one
(Continued)

selectively removable rear baffle is configured to at least partially block the rear-discharge opening.

17 Claims, 5 Drawing Sheets

(51) Int. Cl.
    *A01D 34/71*     (2006.01)
    *A01D 34/81*     (2006.01)
    *A01D 101/00*     (2006.01)

(52) U.S. Cl.
    CPC ........ *A01D 34/005* (2013.01); *A01D 2101/00* (2013.01)

(56) References Cited

U.S. PATENT DOCUMENTS

| | | | | |
|---|---|---|---|---|
| 5,267,429 A * | 12/1993 | Kettler | ................ | A01D 34/005 56/320.2 |
| 5,305,589 A * | 4/1994 | Rodriguez | ............ | A01D 34/005 56/2 |
| 5,465,564 A * | 11/1995 | Koehn | ................ | A01D 34/005 56/13.6 |
| 5,845,475 A * | 12/1998 | Busboom | ............... | A01D 34/74 56/320.1 |
| 5,987,863 A | 11/1999 | Busboom et al. | | |
| 6,192,666 B1 * | 2/2001 | Sugden | ................ | A01D 43/077 56/13.6 |
| 6,681,553 B2 * | 1/2004 | Ferree | ................. | A01D 34/667 56/13.6 |
| 6,996,962 B1 * | 2/2006 | Sugden | ................ | A01D 34/005 |
| 7,299,613 B2 * | 11/2007 | Samejima | ............ | A01D 34/005 56/6 |
| 7,555,887 B2 | 7/2009 | Schick et al. | | |
| 7,574,852 B1 | 8/2009 | Loxterkamp et al. | | |
| 9,485,911 B2 | 11/2016 | Thorman et al. | | |
| 10,524,418 B1 * | 1/2020 | Wright | ................ | A01D 34/005 |
| 2003/0051457 A1 | 3/2003 | Ferree et al. | | |
| 2003/0154705 A1 * | 8/2003 | Sugden | ................ | A01D 34/005 56/320.1 |
| 2004/0006960 A1 | 1/2004 | Samejima et al. | | |
| 2007/0068132 A1 * | 3/2007 | Chenevert | ............ | A01D 34/005 56/320.1 |
| 2007/0068133 A1 * | 3/2007 | Kure | .................... | A01D 34/71 56/320.1 |
| 2008/0072561 A1 * | 3/2008 | Koike | ................ | A01D 34/667 56/320.2 |
| 2009/0178382 A1 | 7/2009 | Sugio et al. | | |
| 2009/0249764 A1 * | 10/2009 | Butler | ................ | A01D 34/005 56/320.1 |
| 2014/0331634 A1 * | 11/2014 | Korthals | .............. | A01D 42/005 56/320.2 |
| 2015/0033693 A1 * | 2/2015 | Ito | ........................ | A01D 43/077 56/255 |
| 2019/0124835 A1 * | 5/2019 | Hilgart | ................. | A01D 34/661 |

OTHER PUBLICATIONS

International Search Report and Written Opinion, PCT/US2018/049839, Briggs & Stratton Corporation (dated Nov. 19, 2018).

* cited by examiner

MULTI-CONFIGURABLE MOWER DECK

CROSS REFERENCE TO RELATED APPLICATIONS

This application is a National Stage Application of PCT/US2018/049839, filed Sep. 7, 2018, which claims priority to U.S. Provisional Patent Application No. 62/555,806, filed Sep. 8, 2017, both of which are incorporated herein by reference in their entireties.

BACKGROUND

The present disclosure relates generally to mower decks for use with ride-on, stand-on, and/or walk-behind lawnmowers, and more particularly to a single, multi-configurable mower deck constructed to selectively provide side-discharge, rear-discharge, mulching, and combined mulching/rear-discharge capabilities.

In side-discharge mower decks, grass or other clippings travel through one or more cutting chambers to a side-discharge opening on one lateral side of the mower deck, where the grass or other clippings are expelled from the mower deck. Rear-discharge configurations, on the other hand, allow grass or other clippings to travel from the one or more cutting chambers to a rear-discharge opening on a rear side of the mower deck, thereby causing the grass or other clippings to be discharged to the rear of the lawnmower relative to the lawnmower's direction of travel. The choice between using a mower deck configured for either side-discharge or rear-discharge may be dependent upon many factors, including lawnmower type/size, regional conditions, customer preferences, etc.

One way to alter and/or customize the cutting configurations available to a mower deck is to employ one or more baffles proximate to the cutting chambers on the underside surface of the mower deck. The one or more baffles may be removably attachable to the mower deck and act to divert the flow of grass or other clippings based on cutting conditions, user needs, and/or customer preferences. For example, one or more baffles may be utilized to convert a mower deck typically configured for side-discharge or rear-discharge into a mulching configuration, wherein grass or other clippings are shredded and returned to the cutting surface below, without being discharged from the side- or rear-discharge openings of the deck. However, even with the mower deck convertibility available through the use of one or more baffles, the user must still choose between a side-discharge deck and a rear-discharge deck, thereby limiting the number of cutting configuration options that a single mower deck may provide to a user. Thus, if the user wishes to switch between side-discharge and rear-discharge configurations, the user must switch mower decks entirely, adding time, cost, and complexity to the act of changing cutting configurations. Additionally, dedicated side-discharge and rear-discharge mower decks are often complex to manufacture, as they each utilize a number of permanent sidewalls and specialized shapes and/or contours specific to side-discharge or discharge configurations.

SUMMARY

In accordance with an aspect of the disclosure, a multi-configurable mower deck is disclosed. The multi-configurable mower deck includes a top surface. The mower deck may further includes a front leading edge. The mower deck may also include at least one side wall extending from the top surface. Additionally, the mower deck may include at least one partial rear wall extending from the top surface. A side-discharge opening may be formed on one side of the mower deck between the front leading edge and the at least one partial rear wall. A rear-discharge opening may be formed through the at least one partial rear wall. Also, a plurality of cutting chambers may be included, wherein each cutting chamber is configured to partially house a respective cutting blade.

According to another aspect of the disclosure, a multi-configurable mower deck is disclosed, the mower deck including a top surface. The mower deck may also include a front leading edge. The mower deck may further include at least one side wall extending from the top surface. At least one partial rear wall extending from the top surface may also be included. A side-discharge opening may be formed on one side of the mower deck between the front leading edge and the at least one partial rear wall. A front baffle may extend from the top surface substantially between the at least one side wall and the side-discharge opening to direct clippings to the side-discharge opening. A rear-discharge opening may be formed through the at least one partial rear wall. Additionally, a selectively removable secondary front baffle configured to block the flow of clippings through the side-discharge opening and direct the flow of clippings toward the rear-discharge opening may be included. The mower deck may also include at least one selectively removable rear baffle, wherein the at least one selectively removable rear baffle is configured to at least partially block the rear-discharge opening.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

Figure 1:
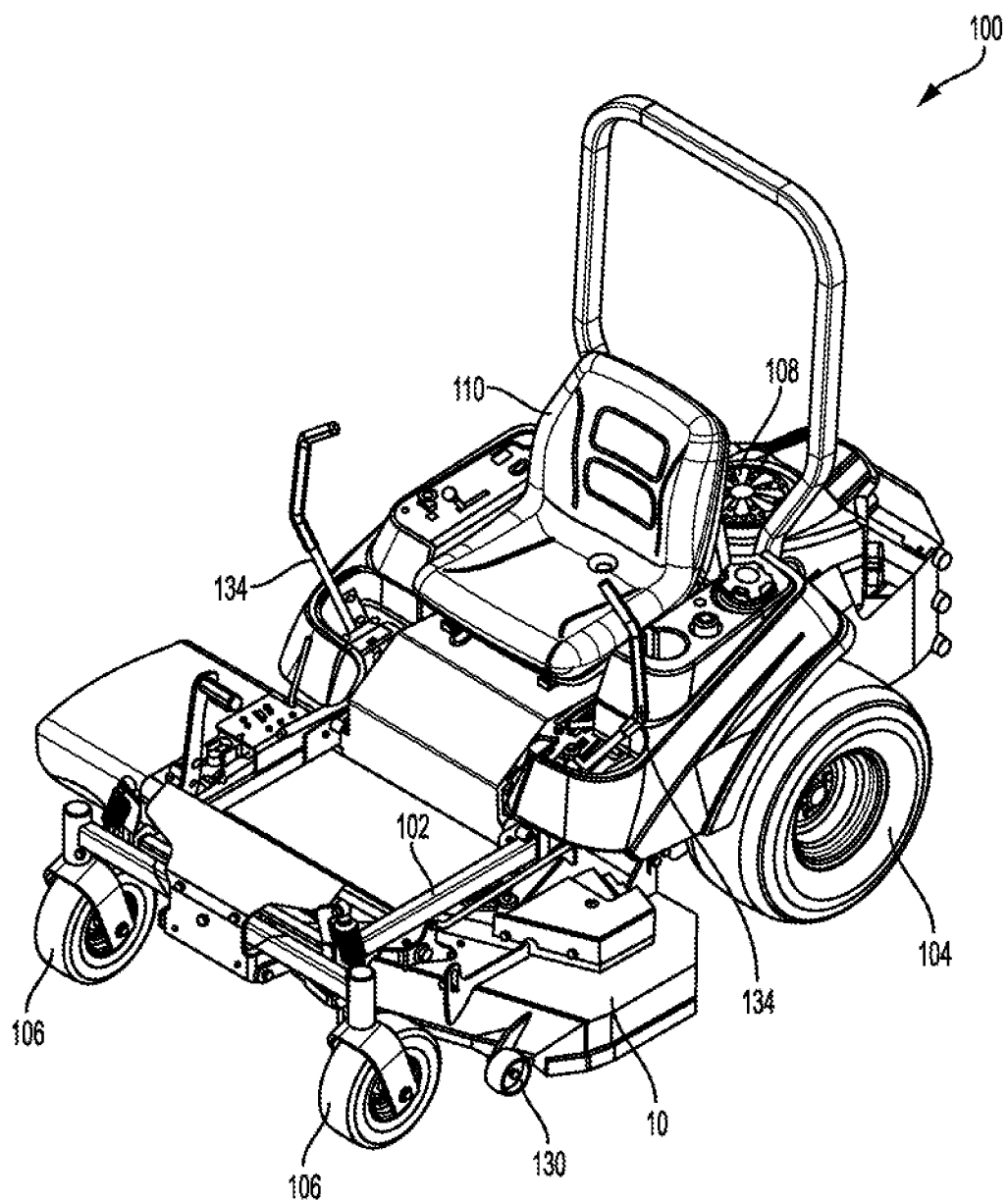
FIG. 1 is an isometric view of a zero turn radius (ZTR) lawnmower in accordance with an aspect of the disclosure.

FIG. 1 illustrates an isometric view of a zero turn radius (ZTR) lawnmower 100 in accordance with an aspect of the disclosure. ZTR lawnmower 100 may include a main frame 102, front caster wheels 106, rear drive wheels 104, and an operator seat 110. The ZTR lawnmower 100 may also include a mower deck 10 positioned between the front caster wheels 106 and rear drive wheels 104. As will be described in further detail below, mower deck 10 is configured to hold one or more rotating mower blades for the cutting of grass and/or other vegetation. Mower deck 10 may include one or more roller (or anti-scalp) wheels 130, which aid in maintaining the height of mower deck 10 above the cutting surface, thereby helping to prevent scalping of the cutting surface, damage from rocks or other debris, etc. ZTR lawnmower 100 may also include at least one power source 108, such as an internal combustion engine, and electric powerhead, etc. In some embodiments, the power source 108 is coupled to mower deck 10 via a series of belts and pulleys (not shown) so as to power the mower blades. Additionally, the ZTR lawnmower 100 may also include left and right control levers 134 for controlling forward, reverse, and turning of the ZTR lawnmower 100. While ZTR lawnmower 100 is shown in FIG. 1 as being a ride-on lawnmower, it is to be understood that ZTR lawnmower 100 could be configured as a stand-on lawnmower, a walk-behind lawnmower, etc.

Figure 2:
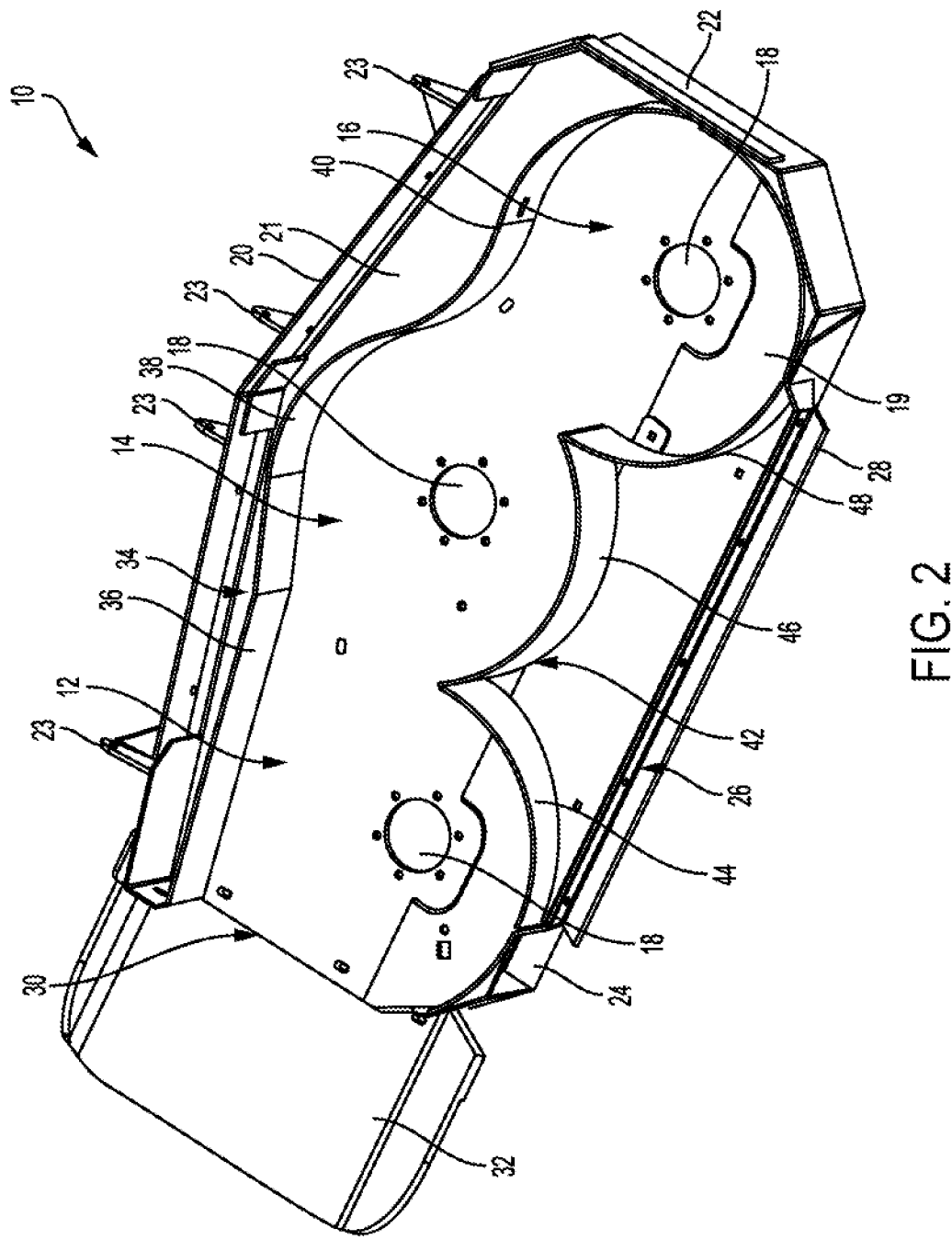
FIG. 2 is a rear perspective view of the underside of a mower deck in a side-discharge configuration in accordance with an aspect of the disclosure.

Referring now to FIG. 2, an underside view of mower deck 10 in accordance with an aspect of the disclosure is illustrated. Specifically, as will be described further below, FIG. 2 shows mower deck 10 in a side-discharge configuration.

As described above with respect to FIG. 1, mower deck 10 may be mounted to any appropriate form of outdoor power equipment, such as a ride-on lawnmower, a stand-on lawnmower, a wide-area walk-behind lawnmower, etc. Mower deck 10 may be formed by any appropriate means, such as sheet metal fabrication, stamping, molding, etc. Additionally, mower deck 10 (and the components of mower deck 10) may be formed of any appropriate material, such as, for example, steel, aluminum, composite materials, and/or any combination thereof.

Mower deck 10 includes a plurality of neighboring cutting chambers 12, 14, 16, wherein each cutting chamber 12, 14, 16 is configured to house a cutting blade (not shown) rotatably mounted within mower deck 10 at respective blade mounts 18. Each cutting blade may be rotated by any appropriate means, such as a belt-and-pulley configuration on a top surface of mower deck 10, a dedicated electric blade motor, etc. Furthermore, while three cutting chambers 12, 14, 16 are shown in FIG. 2, it is to be understood that mower deck 10 may include more or fewer cutting chambers, along with more or fewer cutting blades (e.g., two, four, or more).

Mower deck 10 includes a front leading edge 20. In FIG. 2, front leading edge 20 is formed by a front wall extending downward from a top surface 21 of mower deck 10 (i.e., toward the cutting surface when mounted to a lawnmower). Also extending downward from the top surface 21 is a side wall 22 on a non-discharge side surface, and a partial rear wall 24. In some embodiments, the front wall forming the front leading edge 20 may include a plurality of roller mounts 23, which may be configured to rotatably hold a plurality of rollers (or anti-scalp wheels) (not shown). Alternatively, in other embodiments, instead of a front wall extending downward from top surface 21, mower deck 10 may include a sloped front nose portion (not shown), wherein at least a portion of top surface 21 slopes downward toward the front leading edge 20 of the mower deck 10.

Partial rear wall 24 includes an elongated rear-discharge opening 26 which, in certain configurations of mower deck 10, allows grass or other clippings to exit the mower deck 10 in a rearward direction relative to the direction of travel of the lawnmower carrying mower deck 10. A rear deflector 28 may extend at least partially across rear-discharge opening 26, with rear deflector 28 acting to block, deflect, or knock down any objects such as rocks, branches, etc. which may be expelled by the mower blades at a high rate of speed, while still allowing grass or other clippings to exit the mower deck 10 when utilized in a rear-discharge configuration. Additionally, a deflector plate 19 extends from top surface 21 at a location ahead of rear-discharge opening 26. Deflector plate 19 may extend across all cutting chambers 12, 14, 16, and may be angled downwardly in the direction of rear-discharge opening 26 such that clippings are forced downward toward the rear of mower deck 10. The rear edge of deflector plate 19 may extend below the top surface 21 a distance capable of forcing clippings downward in the direction of rear-discharge opening 26 (e.g., 1 inch, 2 inches, etc.). Additionally, deflector plate 19 may be formed of any appropriate material, such as steel, aluminum, composite, etc., and may be permanently affixed or removably attached to the top surface 21 and/or other surfaces of the mower deck 10.

On a side surface opposite side wall 22, mower deck 10 includes an elongated side-discharge opening 30. In a side-discharge configuration of mower deck 10, side-discharge opening 30 is configured to allow grass or other clippings to be directed from the respective cutting chambers 12, 14, 16 and directed out of one side of the mower deck 10. A side-discharge deflector 32 may be coupled to the mower deck 10 at a location proximate to side-discharge opening 30. Similar to rear deflector 28 described above, side-discharge deflector 32 is configured to block or deflect any objects such as rocks, branches, etc. which may be expelled by the mower blades, while still allowing grass or other clippings to exit the mower deck 10 when utilized in a side-discharge configuration. While not shown in FIG. 2, in some embodiments, side-discharge deflector 32 may be removably coupled to mower deck 10 by a hinge so as to allow side-discharge deflector 32 to pivot vertically with respect to the mower deck 10 when coming into contact with outside objects such as stumps, large rocks, curbs, etc. In this way, side-discharge deflector 32 may pivot away from obstructions, as opposed to catching on such obstructions and potentially becoming damaged.

As noted above, mower deck 10 as shown in FIG. 2 is configured in a side-discharge mode of operation. To provide such a configuration, mower deck 10 includes a front baffle 34 between side wall 22 and side-discharge opening 30, as well as a rear baffle 42 extending across the length of rear-discharge opening 26. Front baffle 34 is shown as having a plurality of baffle sections 36, 38, 40 relative to respective cutting chambers 12, 14, 16. In some embodiments, one or more of baffle sections 36, 38, 40 are at least partially arcuate, which may allow for relatively unobstructed flow of clippings between neighboring cutting chambers in the direction of side-discharge opening 30. In some embodiments, front baffle 34 is permanently fixed to the top surface 21 of mower deck 10 by, for example, welding. However, in other embodiments, front baffle 34 may be removably coupled to the top surface 21 of mower deck 10 by, for example, one or more fasteners. As shown in FIG. 2, front baffle 34 may also be spaced apart from front wall 20 so as to provide a buffer between the surfaces of front baffle 34 and front leading edge 20. Alternatively, though not shown in any of the figures, front baffle 34 may be configured to contact front leading edge 20 (e.g., a front wall) or be otherwise substantially adjacent to front leading edge 20, or front leading edge 20 may itself be contoured to form the front baffle 34, thereby providing no spacing between front baffle 34 and front leading edge 20.

Once again, rear baffle 42 is configured to extend substantially across the length of rear-discharge opening 26, thereby substantially preventing grass or other clippings from exiting the mower deck 10 via rear-discharge opening 26. Rear baffle 42 includes respective arcuate portions 44, 46, 48, which also help to define the respective cutting chambers 12, 14, 16. Both front baffle 34 and rear baffle 42 are configured to extend a certain height below top surface 21 in order to reduce clippings from escaping the cutting chambers 12, 14, 16 in any direction other than that of the side-discharge opening 30. For example, rear baffle 42 may extend between 4 inches to 5 inches below top surface 21, with front baffle 34 extending a similar amount below top surface 21. However, it is to be understood that rear baffle 42 may extend any appropriate distance from top surface 21. With such depth, clippings within each cutting chamber 12, 14, 16 are forced in the direction of the side-discharge opening 30 by the rotating blades, as opposed to at least some clippings escaping the confines of the front baffle 34 and rear baffle 42 and being expelled either forward or rearward of the mower deck 10.

Unlike front baffle 34, which may, in some embodiments, be permanently fixed to the top surface 21, rear baffle 42 is removably coupled to the top surface 21. For example, rear baffle 42 may be coupled to the top surface by one or more fasteners such as bolts, screws, etc. With such a configuration, rear baffle 42 may selectively block rear-discharge opening 26 to substantially prevent clippings from exiting mower deck 10 via rear-discharge opening 26. However, as will be discussed in further detail below, and in accordance with other aspects of the disclosure, the rear baffle 42 may also be removed so as to unblock rear-discharge opening 26.

Figure 3:
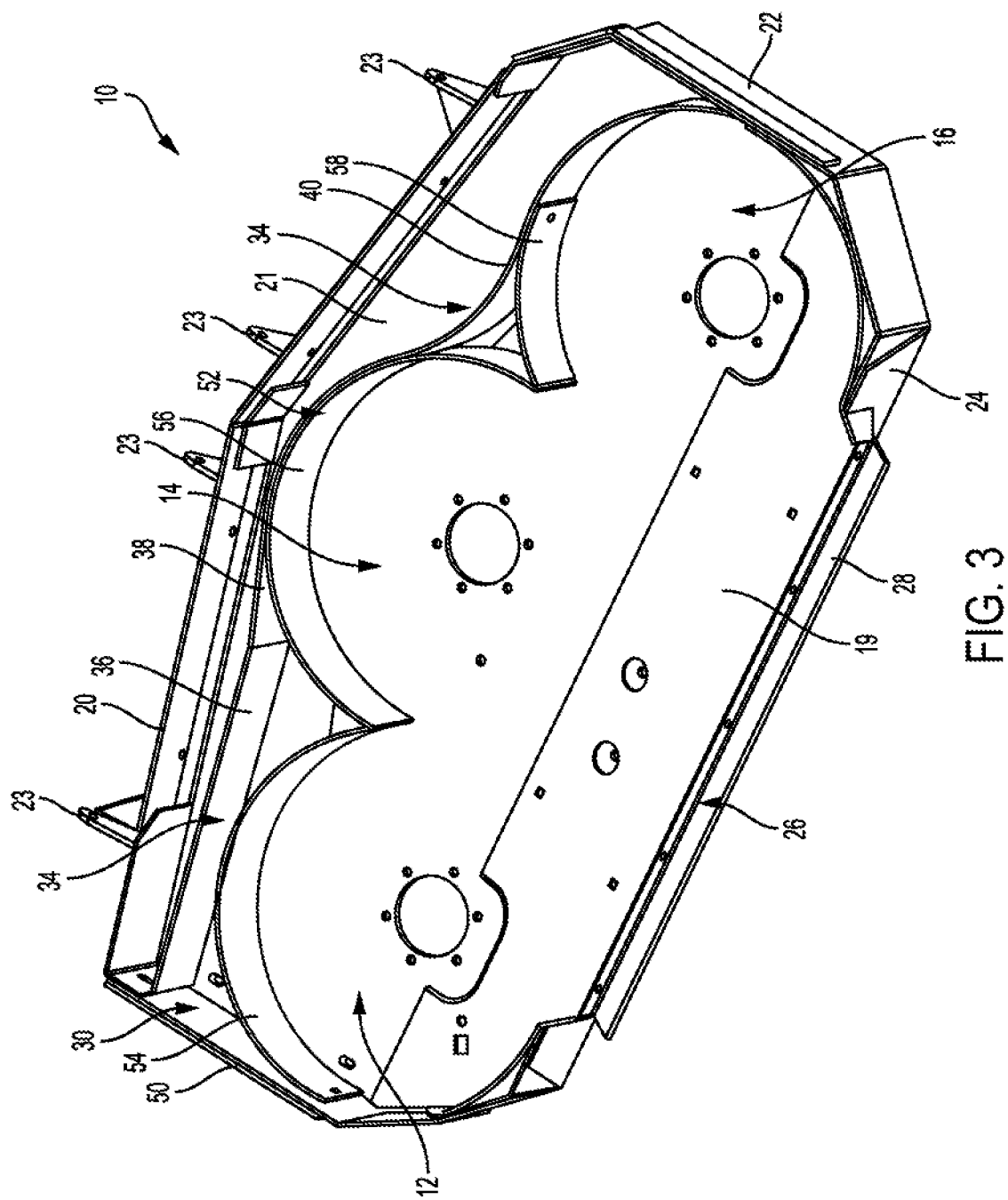
FIG. 3 is a rear perspective view of the underside of the mower deck in a rear-discharge configuration in accordance with another aspect of the disclosure.

Referring now to FIG. 3, in accordance with another aspect of the disclosure, mower deck 10 is shown adapted to be in a rear-discharge configuration. Specifically, in FIG. 3, rear baffle 42 shown and described above with respect to FIG. 3 is removed, thereby unblocking rear-discharge opening 26. Furthermore, a blocking plate 50 is removably coupled to the mower deck such that side-discharge opening 30 is substantially blocked, thereby preventing clippings from exiting side-discharge opening 30 during use. Blocking plate 50 may be attached to various surfaces of the mower deck 10 via any appropriate fasteners, such as bolts, screws, etc. As the side-discharge capability of mower deck 10 is prevented by blocking plate 50, side-discharge deflector 32 may also be removed.

In addition to blocking plate 50, a secondary front baffle 52 may also be removably coupled along top surface 21 of mower deck 10 at a position rearward of front baffle 34. Secondary front baffle 52 may be coupled via one or more appropriate fasteners, such as bolts, screws, etc. The fasteners may couple secondary front baffle directly to the top surface 21, directly to the front baffle 34, and/or directly to the blocking plate 50.

Secondary front baffle 52 includes a plurality of respective arcuate portions 54, 56, 58. That is, unlike front baffle 34 shown in FIG. 2, which is configured to promote the flow of clippings in the direction of side-discharge opening 30, secondary front baffle 52 is formed so as to promote the flow of clippings toward the rear-discharge opening 26 by creating arcuate cutting chambers 12, 14, 16 which open in the direction of rear-discharge opening 26. Similar to front baffle 34 and rear baffle 42 described above, secondary front baffle 52 may extend a sufficient distance below the top surface 21 so as to prevent clippings from flowing forward or to either side of mower deck 10. For example, secondary front baffle 52 may also extend between 4 inches to 5 inches below top surface 21, thereby ensuring that clippings within each cutting chamber 12, 14, 16 are forced in the direction of the rear-discharge opening 26 by the rotating blades, with the clippings following the contours of respective secondary front baffle 54 until finally expelled from mower deck 10. In a rear-discharge mode, clippings from each cutting chamber 12, 14, 16 are directed toward the rear-discharge opening 26.

As shown in FIGS. 2-3, through the use of various removable baffles and/or blocking plates, a single mower deck 10 may be convertible between side-discharge and rear-discharge configurations. Accordingly, unlike common mower decks, which are generally limited to only side-discharge or only rear-discharge capabilities, mower deck 10 allows for either configuration in one device.

Figure 4:
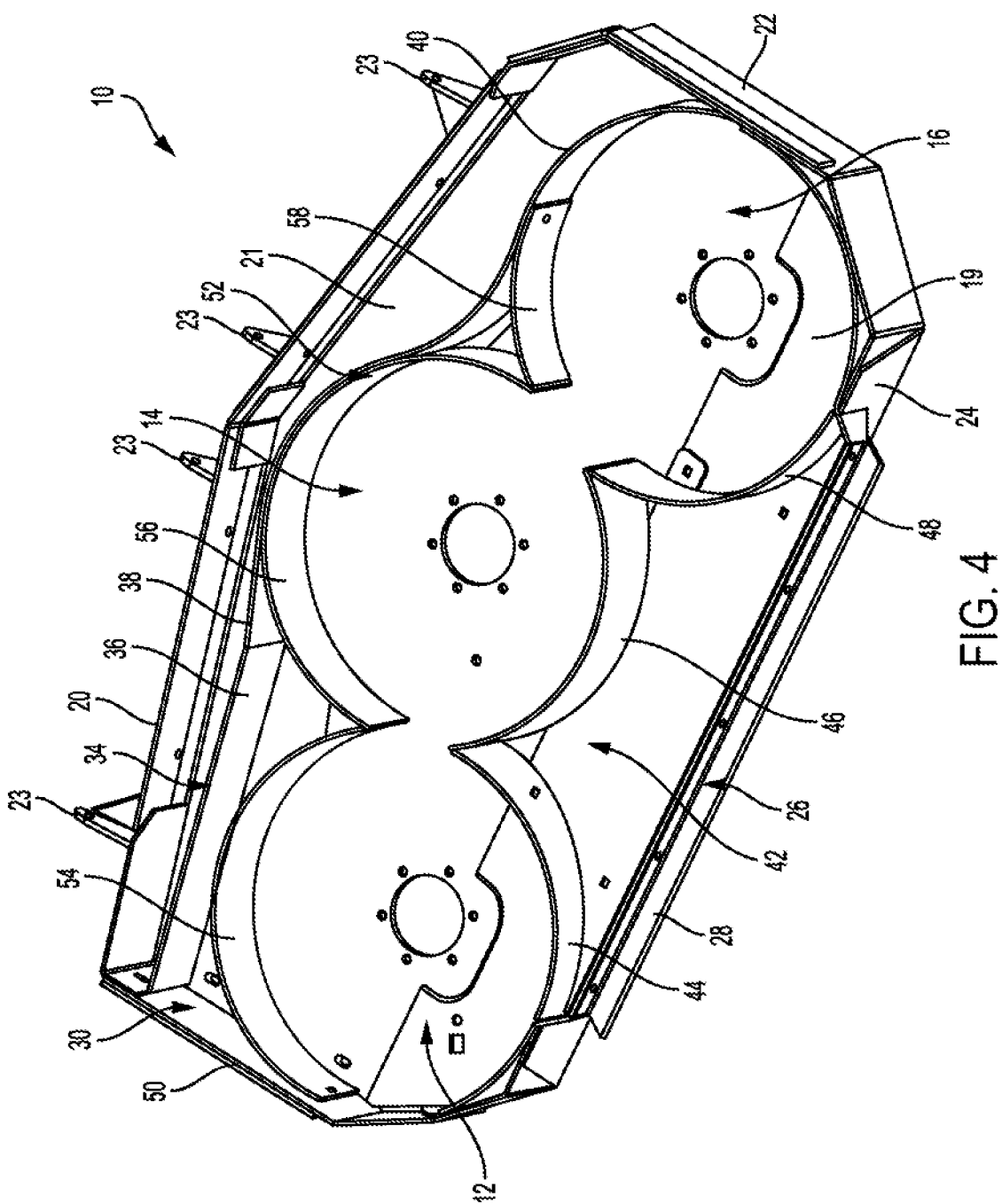
FIG. 4 is a rear perspective view of the underside of the mower deck in a mulching configuration in accordance with another aspect of the disclosure.

Referring to FIG. 4, in accordance with another aspect of the disclosure, mower deck 10 is shown adapted in a mulching configuration. In a mulching configuration, clippings are not discharged through a side- or rear-discharge opening, but are instead cycled within the respective cutting chambers 12, 14, 16 such that clippings are further shredded by the blades during the mowing operation. The shredded clippings eventually fall from the respective cutting chambers 12, 14, 16 and drop directly onto the cutting surface for decomposition on or within the soil.

To provide such a mulching configuration, mower deck 10 shown in FIG. 4 is adapted to include both the rear baffle 42 and the secondary front baffle 52, as described above in FIG. 2 and FIG. 3, respectively. Accordingly, rear-discharge opening 26 is blocked by rear baffle 42, while side-discharge opening 30 is blocked by both a portion of secondary front baffle 52 and blocking plate 50. As rear baffle 42 includes arcuate portions 44, 46, 48 and secondary front baffle includes arcuate portions 54, 56, 58, cutting chambers 12, 14, 16 are formed as partially-cylindrical chambers, which allow clippings to remain and circulate within each respective cutting chamber 12, 14, 16 for further shredding. As discussed above, rear baffle 42 may extend between 4 inches to 5 inches below top surface 21, with front baffle 34 extending a similar amount below top surface 21. With this configuration, clippings are not diverted to either of side-discharge opening 30 or rear-discharge opening 26, but rather downward to the cutting surface during the mowing operation.

Figure 5:
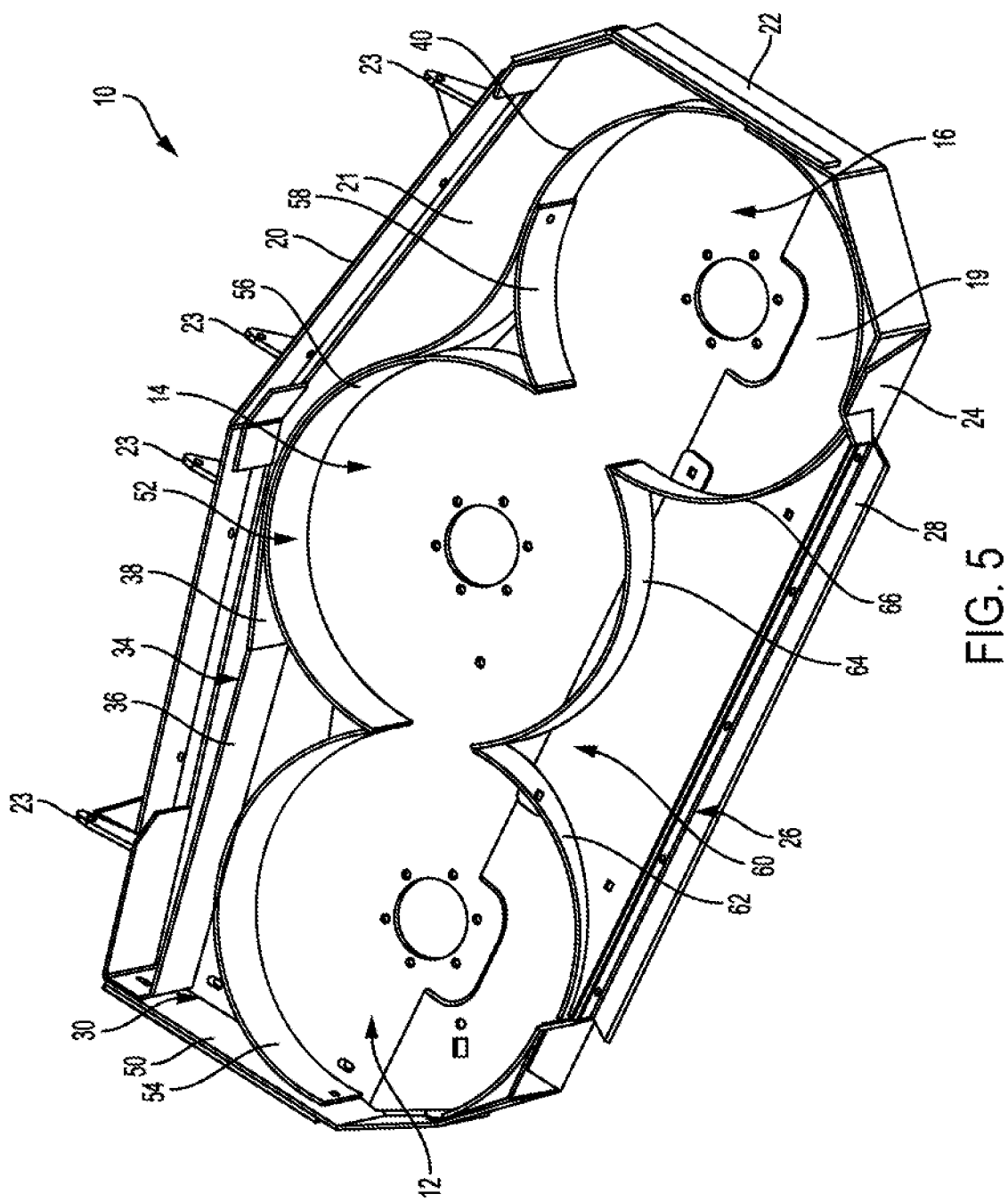
FIG. 5 is a rear perspective view of the underside of the mower deck in a combination mulching/rear-discharge configuration in accordance with another aspect of the disclosure.

Next, referring to FIG. 5, in accordance with another aspect of the disclosure, mower deck 10 is shown adapted in a combination mulching/rear-discharge configuration. As with the mulching configuration shown and described with respect to FIG. 4, the combination mulching/rear-discharge configuration shown in FIG. 5 allows cutting chambers 12, 14, 16 to be formed as partially-cylindrical chambers, allowing some clippings to remain and circulate within each respective cutting chamber 12, 14, 16 for further shredding. However, unlike the mulching configuration shown in FIG. 4, the combination mulching/rear-discharge configuration utilizes a rear baffle 60 having shorter sidewalls than those of rear baffle 42 described above. Specifically, rear baffle 60 may have arcuate portions 62, 64, 66 which extend between, e.g., 2 inches to 3 inches below top surface 21, while front baffle 34 again extends between, e.g., 4-5 inches below top surface 21. In other embodiments, rear baffle 60 and/or front baffle 34 may extend other distances from the top surface 21. For example, rear baffle 30 may extend between 1 inches to 2 inches below top surface 21, or there may be a 1 inch difference between the depth of rear baffle 60 and the front baffle 34.

With this combination mulching/rear-discharge configuration, some clippings are retained and circulated within each respective cutting chamber 12, 14, 16 for shredding, while other clippings are directed over the shortened rear baffle 60 for discharge from rear-discharge opening 26. By enabling some clippings to remain within cutting chambers 12, 14, 16 for shredding, while allowing some clippings to escape through rear-discharge opening 26, mower deck 10 shown in FIG. 5 may have increased grass-handling capacity, allowing for longer grass to be mowed with at least a partial mulching configuration, without overloading the blades within cutting chambers 12, 14, 16 with an excess of clippings.

As discussed above, users of lawnmowers are generally forced to choose between either side-discharge or rear-discharge mower decks, with each type sometimes being adaptable for mulching, combined mulching/discharge, etc. However, various cutting conditions and user and/or customer preferences may warrant the use of side-discharge in some instances and rear-discharge mower decks in others, forcing the user to either purchase and maintain both types of mower deck, or settle for one type of mower deck and discharge configuration. With the mower deck 10 described above with respect to FIGS. 2-5, though, the user may utilize a single mower deck in a variety of configurations, including side-discharge, rear-discharge, mulching, and combined mulching/rear-discharge modes. Accordingly, the user is able to customize a single mower deck 10 through the use of removable baffles and/or blocking plates to fit the conditions, preferences, and/or customer needs. Additionally, because the single mower deck 10 may include a plurality of openings and/or removably attachable blocking plates and baffles, the overall complexity of manufacturing mower deck 10 may be reduced.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A multi-configurable mower deck comprising:
a top surface;
a front leading edge;
at least one side wall extending from the top surface;
at least one partial rear wall extending from the top surface;
a side-discharge opening formed on one side of the mower deck between the front leading edge and the at least one partial rear wall;
a rear-discharge opening formed through the at least one partial rear wall;
a front baffle extending from the top surface and configured to direct clippings to the side-discharge opening;
a selectively removable secondary front baffle, wherein the front baffle is arranged between the front leading edge and the secondary front baffle;
a plurality of cutting chambers, wherein each cutting chamber is configured to partially house a respective cutting blade, and wherein the secondary front baffle defines at least a portion of two cutting chambers;
a selectively removable side-discharge opening blocking plate, wherein the side-discharge opening blocking plate is configured to prevent clippings from exiting the mower deck from the side-discharge opening, and further wherein the secondary front baffle is configured to direct clippings from the plurality of cutting chambers to the rear-discharge opening; and
a selectively removable rear baffle configured to be coupled to the top surface, wherein, when coupled to the top surface, the rear baffle extends a distance from the top surface that is less than a distance that the front baffle extends from the top surface, and wherein the rear baffle is configured to partially block the rear-discharge opening.

2. The multi-configurable mower deck of claim 1, wherein the front baffle is permanently affixed to the top surface.

3. The multi-configurable mower deck of claim 1, wherein an entirety of the front baffle is spaced apart from the front leading edge.

4. The multi-configurable mower deck of claim 1, wherein the rear baffle comprises a plurality of arcuate portions and the secondary front baffle comprises a plurality of arcuate portions, the respective arcuate portions of the rear baffle and the secondary front baffle being complimentarily positioned to form a plurality of partially cylindrical cutting chambers to allow for mulching of clippings within each respective cutting chamber.

5. The multi-configurable mower deck of claim 1, wherein the rear baffle extends from the top surface a distance of between 2 inches and 3 inches, and the front baffle extends from the top surface a distance of between 4 inches and 5 inches.

6. The multi-configurable mower deck of claim 1, further comprising a rear deflector extending at least partially across the rear-discharge opening.

7. The multi-configurable mower deck of claim 1, further comprising a removable side-discharge deflector extending at least partially across the side-discharge opening.

8. A multi-configurable mower deck comprising:
a top surface;
a front leading edge;
at least one side wall extending from the top surface;
at least one partial rear wall extending from the top surface;
a side-discharge opening formed on one side of the mower deck between the front leading edge and the at least one partial rear wall;

a front baffle extending from the top surface substantially laterally from the at least one side wall to the side-discharge opening to direct clippings to the side-discharge opening;

a rear-discharge opening formed through the at least one partial rear wall;

a selectively removable secondary front baffle coupled to the front baffle and configured to block the flow of clippings through the side-discharge opening and direct the flow of clippings toward the rear-discharge opening wherein the front baffle is arranged between the front leading edge and the secondary front baffle;

a selectively removable rear baffle configured to be coupled to the top surface, wherein, when coupled to the top surface, the rear baffle extends a distance from the top surface that is less than a distance that the front baffle extends from the top surface, and wherein the rear baffle is configured to partially block the rear-discharge opening;

a plurality of cutting chambers, wherein each cutting chamber is configured to partially house a respective cutting blade wherein the secondary front baffle defines at least a portion of two cutting chambers; and a selectively removable side-discharge opening blocking plate, wherein the side-discharge opening blocking plate is configured to prevent clippings from exiting the mower deck from the side-discharge opening, and further wherein the secondary front baffle is configured to direct clippings from the plurality of cutting chambers to the rear-discharge opening.

9. The multi-configurable mower deck of claim 8, further comprising a selectively removable side-discharge blocking plate, wherein the selectively removable side-discharge blocking plate is sized to substantially block the flow of clippings through the side-discharge opening.

10. The multi-configurable mower deck of claim 8, wherein the front baffle is permanently affixed to the top surface.

11. The multi-configurable mower deck of claim 10, wherein the at least one selectively removable rear baffle extends from the top surface a distance of between 4 inches and 5 inches.

12. The multi-configurable mower deck of claim 8, wherein the at least one selectively removable rear baffle extends from the top surface a distance of between 2 inches and 3 inches.

13. The multi-configurable mower deck of claim 1, wherein the secondary front baffle is coupled to the front baffle.

14. The multi-configurable mower deck of claim 13, wherein the secondary front baffle includes a plurality of arcuate portions.

15. The multi-configurable mower deck of claim 1, further comprising a rear edge deflector plate extending laterally across each of the plurality of cutting chambers.

16. The multi-configurable mower deck of claim 15, wherein the rear edge deflector plate is angled downwardly in the direction of the rear-discharge opening.

17. A multi-configurable mower deck comprising:

a top surface;

a front leading edge;

at least one side wall extending from the top surface;

at least one partial rear wall extending from the top surface;

a side-discharge opening formed on one side of the mower deck between the front leading edge and the at least one partial rear wall;

a rear-discharge opening formed through the at least one partial rear wall;

a front baffle extending from the top surface;

a selectively removable secondary front baffle, wherein the front baffle is arranged between the front leading edge and the secondary front baffle;

a plurality of cutting chambers, wherein each cutting chamber is configured to partially house a respective cutting blade, and wherein the secondary front baffle defines at least a portion of two cutting chambers; and a selectively removable rear baffle configured to be coupled to the top surface, wherein, when coupled to the top surface, the rear baffle extends a distance from the top surface that is less than a distance that the front baffle extends from the top surface, and wherein the rear baffle is configured to partially block the rear-discharge opening.

\* \* \* \* \*